United States Patent [19]
Hiersig et al.

[11] 3,826,218
[45] July 30, 1974

[54] COMBINATION DRIVE FOR SHIPS

[75] Inventors: Heinz M. Hiersig, Dusseldorf-Oberkassel; Klaus Hänsgen; Erwin Fleischmann, both of Witten, all of Germany

[73] Assignee: Mannesmann-Meer Aktiengesellschaft, Monchengladbach, Germany

[22] Filed: Feb. 5, 1973

[21] Appl. No.: 329,743

[30] Foreign Application Priority Data
Feb. 8, 1972    Germany............................ 2206513

[52] U.S. Cl.................. 115/34 R, 60/97 R, 74/661, 192/84 P, 192/.032
[51] Int. Cl.............................................. B63h 1/14
[58] Field of Search......... 115/34 R; 60/97 R, 97 B; 74/661; 192/84 P, .098, 48.5, 103 R, .033, .032, .034; 317/5; 303/21 EB; 318/52, 8; 303/21 CG

[56] References Cited
UNITED STATES PATENTS

| | | | |
|---|---|---|---|
| 2,229,544 | 1/1941 | Bauer................... | 115/34 R |
| 3,388,684 | 6/1968 | Gros et al. ............. | 74/661 |
| 3,414,771 | 12/1968 | Rosenberg et al....... | 317/5 |
| 3,460,656 | 8/1969 | Swanson ................ | 60/97 R |
| 3,589,776 | 6/1971 | Wehde.................. | 303/21 CG |
| 3,593,094 | 7/1971 | Katsumaru............. | 318/8 |
| 3,680,655 | 8/1972 | Beyerlein et al........ | 318/52 X |
| 3,683,719 | 8/1972 | Gros.................... | 192/48.5 |

FOREIGN PATENTS OR APPLICATIONS

| | | | |
|---|---|---|---|
| 731,743 | 1/1943 | Germany.............. | 115/34 R |
| 1,054,288 | 4/1959 | Germany.............. | 192/84 P |

Primary Examiner—George E. A. Halvosa
Assistant Examiner—Edward R. Kazenske
Attorney, Agent, or Firm—Ralf H. Siegemund

[57] ABSTRACT

A combination drive arrangement for ships comprises at least one regular driving engine and a gas turbine, both arranged to be releasably connected to the propeller shaft of the ship by means of shaft clutches. Rotary input and output parts of the clutch are connected to speed pickup devices which are connected to a speed comparator for disconnected clutch and to a torsional angle comparator during synchronous running of turbine and clutch output. The speed comparator when detecting speed synchronism causes the clutch to shift into its engaged position. Upon detecting an overload on the clutch by measuring the torsional angle between the primary and secondary parts thereof, the torsional angle comparator controls disengagement of the clutch to disconnect the turbine from the propeller.

4 Claims, 1 Drawing Figure

PATENTED JUL 30 1974
3,826,218
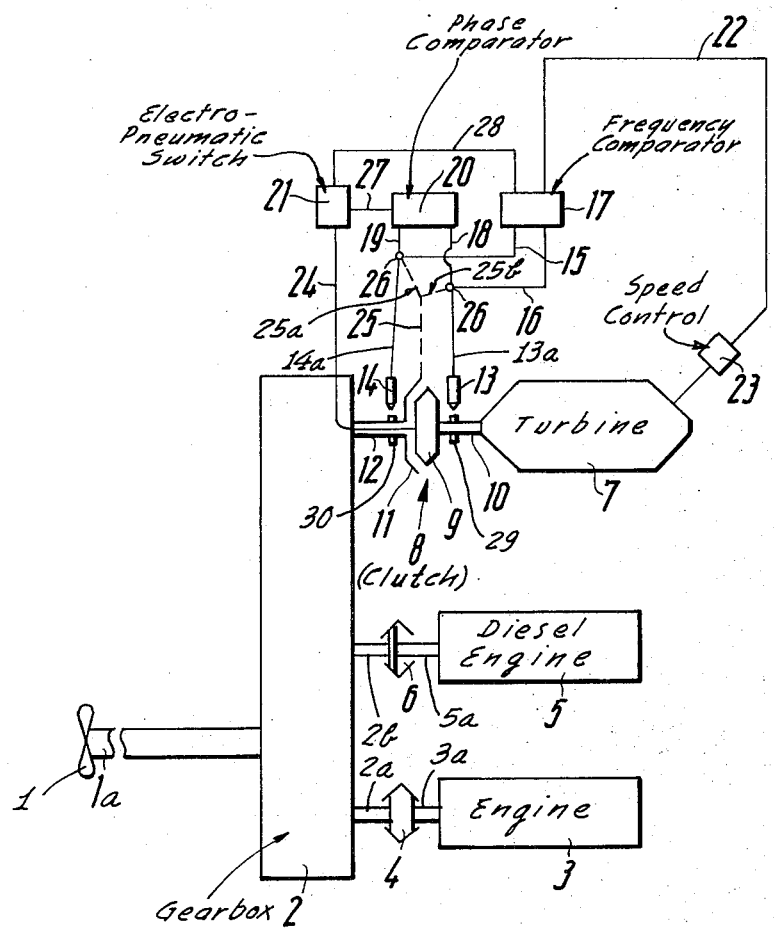

COMBINATION DRIVE FOR SHIPS

BACKGROUND OF THE INVENTION

The invention in general relates to a combination drive arrangement for ships and more in particular, to a novel arrangement for connecting and disconnecting one of the driving stages of the drive arrangement.

Already known in the art are combination drives for operating the propeller shaft of a ship in different speed ranges. Such a drive includes, for example, a usual driving engine such as a diesel engine or any other suitable type of engine driving the vessel for regular cruising whereas a gas turbine can be used to drive the vessel at a higher speed. Drive arrangements of this kind are employed, for example, in ships of the Coast Guard and in other military vessels and enable these ships to travel at their usual cruising speed of, for example, 15 knots per hour when driven by regular engine. On the other hand, the ship is to travel for a short period of time at a considerably higher speed such as, for example, 40 to 50 knots per hour, by means of a high power, i.e., high-performance drive such as a gas turbine.

Since the gas turbine is used only occasionally for driving the propeller, a clutch is provided either directly between the turbine and the propeller shaft or between the turbine and a gear transmission which, in turn, is coupled to the propeller shaft. Conventionally, the shaft clutch comprises a primary rotary input part which is fixedly connected to the drive shaft of the turbine and a secondary, rotary output part which is fixedly connected either directly to the propeller shaft or to a driven shaft of the gear transmission unit coupled to the propeller shaft as stated. In operating condition of the clutch, the primary part engages the secondary part to drive the propeller shaft. At normal cruising speed of the ship, i.e., when the ship is driven by its main drive, the shaft coupling of the trubine is disengaged. However, the secondary part of the clutch follows the rotation of the revolving propeller via the transmission unit. In switching from normal drive mode to an accelerated, high speed drive mode, the shaft clutch of the turbine is to be engaged. Such a changeover, however, is not possible when the turbine is still at rest or when it runs at a speed which is still quite low or substantially higher than the speed of the revolving secondary part of the clutch. Engagement of the clutch in both these instances would result in an overload and a possible break-down of the clutch. From the above it will be appreciated that the main disadvantage of hitherto existing composite drive arrangements is the lack of means to properly synchronize the relative speeds of the primary and secondary parts of the coupling. In this respect, the use of an engageable and disengageable positive coupling would not be feasible since such couplings require synchronous speeds of the primary and secondary coupling parts in order to be engaged. In many ways, however, a coupling of this kind is desirable.

SUMMARY OF THE INVENTION

It is an object of the invention to provide a drive arrangement for ships which enables a trouble-free transition from regular cruising of the ship to an accelerated, high-performance driving mode thereof.

It is another object of the present invention to provide control elements which effect automatic synchronization of the respective speeds of the primary and secondary parts of the turbine clutch or coupling.

It is a further object of the invention to provide further control elements which ensure automatic disengagement of the turbine clutch during periods of overload on the clutch.

According to the preferred embodiment of the invention, these objects are realized by providing the primary and secondary parts of the turbine clutch each with a speed sensing device and by connecting these two devices to the input stage of a comparator for comparing the values measured by the sensing devices. A switching device connected to the output stage of the comparator utilizes the comparison result to place the coupling or clutch into its engaged position during synchronous running of the primary, rotary input part, and the secondary, rotary output part of the clutch.

In addition, it is suggested to continously supervise the relative angular phase between rotary input and output of the clutch and to open the clutch or coupling when the phase angle exceeds a limit indicative of excessive load on the clutch.

By this arrangement, the gas turbine can be drivingly connected to the propeller only when the turbine has reached a speed which corresponds to that of the secondary part of the clutch which, in turn, corresponds to the speed of the propeller shaft (subject to the speed modification in the gearbox). In this condition, the speed of the turbine is adjusted to the actual traveling speed of the ship before the clutch engages. The shaft couplings as positioned between the other drive engines and the propeller shaft can be disengaged subsequently to engagement of the turbine clutch so that the ship is now solely driven by the gas turbine and which, subsequently, can be operated at its maximum high speed capacity. However, it is also feasible to use an superposing gear transmission so that the regular driving engine can continue their operation and are thereby able to accept some of the load, although small, of the propulsion system.

According to a further development of the invention, the output stage of the comparison device or comparator includes a second line connected to a speed command device for the gas turbine. The comparator, thus, provides an input to the speed control of the turbine which is proportional to the difference in speeds as individually measured by the speed sensing and pickup devices. In this manner, the difference in the measured values is used to automatically adjust the turbine to a speed necessary to effect synchronization of the primary and secondary parts of the turbine clutch.

It is preferred to use non-contacting speed sensing and pickup devices which, according to the further development of the invention, respectively produce signals representing speed values in the form of electrical pulses. The pulse rate frequency represents directly the speed of the rotating parts while the phase between the pulse trains represents the phase angle between these rotating parts. The pulses are preferably furnished in groups. Such groups of pulses can be established by positioning and distributing a plurality of pulse generating markings (e.g. magnetic poles, protrusion, optical markings) evenly about the circumference of the primary and secondary parts of the clutches but leaving out one of the pulse generating markings from each of the primary and secondary parts of the clutch. In operation, the otherwise continuous train of pulses is now interrupted once during each revolution as a result of the one failing pulse. This arrangement is advantageously used in a further development of the invention in which the pickup devices are connected to a second comparison device or comparator which serves to measure the phase or torsional angle between the primary and secondary parts of the clutch. The second comparator, in effect, operates to convert a displacement or phase shift of the frequency groups relative to each other into a signal representing or being even proportional to the torque transmitted by the turbine shaft clutch. The output stage of the second comparator is connected to the switching device and supplies a cut-off signal thereto to disconnect the shaft clutch when the output signal of the second comparator and resulting from phase shift of the pulse groups indicates an overload on the clutch.

It can thus be seen that in this manner the clutch control positively causes automatic engagement of the turbine clutch upon synchronization of the speeds of the primary and secondary parts of the clutch, and automatic disengagement thereof is effected during periods of overload on the clutch.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE shows a block diagram illustrating a drive arrangement for a ship including two diesel engines, a gas turbine and a control system for connecting and disconnecting the turbine.

Proceeding now to the detailed description of the drawings, the composition drive arrangement for a ship according to the invention is seen to comprise a propeller 1 driven by a propeller shaft 1a. Two diesel engines 3 and 5 constitute the main or normal drive for shaft 1a and propeller 1. In addition, a gas turbine 7 is provided as accelerated and high-performance drive for the propeller 1.

An output shaft 3a of diesel engine 3 is coupled to a shaft 2a of a gear transmission unit 2 by means of a shaft coupling or clutch 4. Diesel engine 5, similarly, is connected with its drive shaft 5a to a shaft 2b of the gear unit 2 by way of a shaft coupling or clutch 6. The shaft couplings or clutches 4 and 6 are engageable and disengageable in any suitable manner. Clutches 4, 6 and 8 are shown, for example, in U.S. letters Pat. Nos. 3,669,230 or 3,708,048, whereby particularly clutch 8 is to be of the variety that is elastic under torsional load. See also U.S. letters Pat. No. 3,791,497 and U.S. application Pat. No. 314,215 of the same assignee. See also U.S. Pat. No. 3,669,230 for gearing.

A third, pneumatically operated shaft coupling or clutch, generally indicated at 8, serves to couple a drive shaft 10 of gas turbine 7 to a hollow, driven shaft 12 of gear unit 2. The clutch 8 essentially consists of a primary or rotary input part 9 fixedly connected to turbine shaft 10 while a secondary, or rotary output part 11 is fixedly connected to gear input shaft 12.

During travel of the ship at its normal cruising speed, propeller shaft 1a is powered by engines 3, 5, and during this mode of operation, clutch 8 is disengaged and the turbine 7 is disconnected or stands idle in a standby mode. Shaft 12, however, is coupled to the propeller shaft 1a by means of gears of gear unit 2 and rotates corresponding to the speed of propeller shaft 1a, as modified by the gearbox. Vice-versa, when gas turbine 7 is coupled to gearbox 2 as will hereinafter be more fully explained, shaft couplings 4 and 6 are, or could be disengaged and the propeller shaft 1a may then solely be driven by the high-performance drive of turbine 7. However, in case gear unit 2 is a superposing gear structure, couplings 4 and 6 may remain engaged, and engines 3 and 5 remain operative during high-performance drive, taking some of the load.

A speed sensing pickup device 13 is connected to the primary part 9 and a speed sensing pickup device 14 is connected to the secondary part 11. A plurality of pulse generating markings 29 and 30 are provided and distributed evenly, respectively, about the circumference of the primary and secondary part 9, 11, of the coupling 8. These pulse markings are associated with pickup devices 13 and 14 and form non-contacting speed sensing units therewith. As a marking passes a pickup device, a pulse is produced. For details see e.g. U.S. letters Pat. Nos. 3,414,771 or 3,589,776. Thus, upon rotation of parts 9/10 and 11/12, trains of pulses are produced by the pickup devices. Therefor, these pulse generating markings 29, 30, with their associated pickup devices 13, 14, serve to produce signals in which the measured speed is represented in the rate of occurrence of electrical pulses and the pulse rate frequency directly represents the speed of the several revolving parts.

The pulses are suitably divided into groups in that one of the otherwise evenly distributed markers 29–30 on both, the primary and the secondary parts of the coupling 8, has been left out. Consequently, one pulse per revolution will be missing from each train and the repetition of the one pulse gap per pulse group represents one revolution of the respective rotating part. The speed sensing and pickup devices 13 and 14 have output lines 13a and 14a respectively. The speed sensing devices 13 and 14 are coupled to the input stage of the comparator 17 by means of connecting wires 15, 16, respectively connected to the lines or wires 14a and 13a by means of switches 26.

Speed comparator 17 comprises the pulse trains as furnished by the pickup devices 13, 14. In particular, the comparator 17 may derive an ac signal from the two pulse trains as produced by the pickups 13 and 14, and by means, e.g. of frequency discriminator a signal is generated by and in comparator 17 which represents the speed deviation between rotaty input and output of clutch 8. A particular control signal will be provided by unit 17 when the frequencies are similar (For a comparator, see e.g. U.S. letters Pat. No. 3,680,655).

During synchronous running of the primary part 9 as connected to the turbine shaft 10 and the secondary part 11, as connected to shaft 12 of gear unit 2, comparator 17 supplies the particular control signal as an actuating signal to an electro pneumatic switching device 21, via a connecting line 28. The switching device 21, in turn, actuates clutch 8 to move the clutch into engaged position by means of applying pressure to a conduit 24 which extends from switching device 21, through the hollow shaft 12 of gear unit 2, to the primary part 9 of the pneumatically operated clutch 8.

As long as the parts 10, 9, 11, 12, rotate in unison, comparator 17 will produce that actuating control signal which causes the electro pneumatic switch to maintain clutch 8 in engaged position, The driving connection between turbine and the gear/propeller system is (or can be) dynamically maintained in a loop that remains stable because of engagement of the clutch. However, a disconnect connection exists when the torque on the clutch becomes so large so that the rotary input and output parts undergo a torsional angle phase displacement. Therefor, it is advisable to supervise the clutch when engaged as follows.

A second comparator 20 is provided for comparing the torsional angle between the primary and secondary parts 9 and 11, of the coupling 8 (For a comparator, see e.g. U.S. Pat. No. 3,593,094). As shown, the torsional angle comparator 20 is respectively connected at its input side to the speed measuring devices 13, 14, of primary and secondary parts 9, 11, by means of input lines 18, 19, which are respectively connected to wires 13a and 14a in the alternative position of switches 26. The switches 26 are operated by and in response to the position of clutch 8 in that pickups 13 and 14 connect to comparator 17 only as long as the clutch is disconnected. Upon clutch engagement, the connection of the pickup 13 and 14 is transferred to the inputs of comparator 20.

Comparator 20 detects any phase displacement of the pulse trains and groups relative to each other. That phase displacement is representative of the torque transmitted by and through shaft coupling 8. The output stage of the torsional angle comparator 20 is connected to the switching device 21 by means of a connecting wire 27 and supplies a cut-off signal thereto for disconnecting the shaft coupling 8 when the phase shift signal between the pulse groups exceeds a predetermined limit, established, for example, by a reference input to comparator 20.

The broken and branching line 25 serves to indicate the alternative output paths from speed sensing devices 13, 14, once into comparator 17 and alternatively into comparator 20. In engaged position of clutch 8 the measuring devices 13, 14, are connected to the torsional angle comparator 20, as indicated by the line sections 25 and 25a, and in disengaged position of the clutch the pickup devices are connected to speed comparator 17, as indicated by the line sections 25 and 25b. In effect, the connection to the speed comparator 17 needs only to be maintained for such a period till the speed measuring devices 13 and 14 indicate a synchronous running of primary part 9 and of secondary part 11 of clutch 8 at which time the clutch is pneumatically actuated and shifted into its engaged position by the switching device 21. Upon engagement of the clutch 8 the pulses of speed measuring devices 13, 14, are applied to phase comparator 20 for supervising and for monitoring the torsional angle of the coupling 8 being a torsion elastic coupling for that purpose. Normally then, the clutch engaging position is dynamically maintained by the phase sensitive comparator 20.

One could use the phase shift of the pulses of the trains from pickups 13 and 14 torsion on the clutch themselves for detecting any phase shift, but the division of the pulses in groups enhences resolution of the device as a whole for the following reasons. The distribution of pulse generating markings denotes the resolution of the control system, as the pulse rate frequency (and, therefor, frequency differences) for a given rotational speed of the several parts is the higher the more markings are used. On the other hand, narrow spacing of the markings limits the range of phase angle differences that can be detected. However, upon dividing the pulses into groups, maximum resolution as to phase shift is available if all pulses produced upon one revolution of the respective rotating part establish one group. The torque angle is now detected on basis of phase comparison among pulse groups, so that 360° phase shift equals one complete revolution rather than one marker spacing.

Leaving one pulse out for each revolution will not deteriorate the speed measurement on basis of pulse rate frequency detection. On the other hand, a single missing pulse per revolution suffices to detect a fundamental, equal in frequency, to the RPM (or RPS) number and these fundamentals are then compared in device 20 as to phase. Clutch 8 will not necessarily engage initially on phase angle difference zero, unless the clutch parts are constructed for form fitting engagement, to provide for a preferred engagement as to relative phase. Moreover, the devices 20 and 21 may temporarily control pneumatic pressure on clutch 8 to provide relative slippage until the phase angle is zero. The torque supervision will then proceed from that operational state.

As described hereinbefore, the torsional angle and phase comparator 20 may indicate an overload on the clutch and will supply a cut-off signal to the switching device 21 via signal line 27, so as to separate the turbine from the gear. As soon as the clutch 8 releases turbine 7 from the load, the connection between pickups 13 and 14 changes back to speed comparator 17, and since the disconnect and decouple condition was predicated on an excessive load, a speed differential will be established rapidly so that a reconnect condition is not (or at least not right away) signalled by speed comparator. In other words, the disconnect state is likewise maintained dynamically.

According to a further development of the invention, the output stage of speed comparator 17 includes a second output which is connected via a line 22 to a speed adjusting device 23 of the gas turbine 7. Device 23 may be or may include a source for a command signal which is used in the turbine 7 for control therein. The difference in speed values detected by comparator 20 is used to modify the speed command for the turbine, so that the turbine attempts to equalize the speed on both sides of the yet disconnected clutch 8. As soon as the gas turbine 7 has reached the speed equal to the speed of shaft 12 of gear unit 2, the shaft clutch 8 is engaged. The speed of the turbine is increased subsequently to its maximum capacity by immediate, if necessary, manual actuation of the speed command generator 23. At that time, comparator 17 is disconnected from the circuit because clutch supervision is carried out through phase comparator 20.

The invention is not limited to the embodiments described above but all changes and modifications thereof not constituting departures from the spirit and scope of the invention are intended to be included.

We claim:

1. In a composition drive arrangement for ships comprising a propeller shaft; a driving engine constituting the main drive for said propeller shaft and being detachably coupled thereto; a gas turbine having a drive shaft and constituting an accelerated drive for said propeller shaft; and an engageable shaft clutch for detachably connecting said gas turbine with said propeller shaft, and said clutch having a primary part connected to said drive shaft of said turbine and having a secondary part connected to a gear box which in turn is connected to said propeller shaft, the improvement comprising:

the shaft clutch being elastic under torsional load;

a first and a second pickup means respectively associated with said primary and secondary parts for providing signals representing the progressing phases and relative speeds of said clutch parts;

first speed comparison means connected to said first and second pickup means for comparing the speed values as provided by said first and second pickup means in disengaged position of said clutch and providing a control signal when said clutch parts have equal speeds;

second comparison means connected to said first and second pickup means when said clutch is in its engaging position to detect any phase difference, the signals in representation of a phase difference between said primary and secondary parts of the clutch; and control means connected to said first speed comparison means and actuated by said control signal to position said clutch into its engaged position during synchronous running of said primary and secondary parts of said clutch, the control means further connected to said second comparison means for operating the clutch in response to overload on the clutch and disconnecting the clutch accordingly.

2. In an arrangement as in claim 1, and comprising speed adjusting means for said gas turbine and connected to said speed comparing means to control said speed adjusting means for controlling the speed of said turbine relative to said propeller shaft.

3. A drive arrangement as in claim 1, a plurality of pulse generating markings being provided and evenly distributed about the circumferences, respectively, of said primary and secondary parts, the pickup means being a pair of pulse detectors, positioned in physical proximity to said parts of said clutch as having said markings, the detectors respectively providing two trains of pulses upon rotation of said parts, said speed comparing means being responsive to the respective pulse rate frequencies of these pulses in the trains.

4. In an arrangement as in claim 3, wherein the number of pulses in the trains per unit time exceeds the number of revolutions of the respective parts per said unit time, and wherein the pulses in the train are presented in groups, said torque comparing means comparing the relative phase of the pulse groups of the trains.

* * * * *